(12) United States Patent
Abraham et al.

(10) Patent No.: US 9,883,437 B2
(45) Date of Patent: Jan. 30, 2018

(54) SYSTEMS AND METHODS FOR ENHANCED NETWORK HANDOFF TO WIRELESS LOCAL AREA NETWORKS

(71) Applicant: Qualcomm Incorporated, San Diego, CA (US)

(72) Inventors: Santosh Paul Abraham, San Diego, CA (US); George Cherian, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 624 days.

(21) Appl. No.: 13/835,070

(22) Filed: Mar. 15, 2013

(65) Prior Publication Data
US 2013/0336287 A1 Dec. 19, 2013

Related U.S. Application Data

(60) Provisional application No. 61/661,713, filed on Jun. 19, 2012.

(51) Int. Cl.
*H04W 36/14* (2009.01)
*H04W 4/02* (2009.01)
(Continued)

(52) U.S. Cl.
CPC ............ *H04W 36/14* (2013.01); *H04W 4/02* (2013.01); *H04W 12/06* (2013.01);
(Continued)

(58) Field of Classification Search
CPC ....... H04W 36/14; H04W 4/02; H04W 12/06; H04W 36/0066; H04W 36/0061; H04W 36/08; H04W 88/16; H04W 84/12
See application file for complete search history.

(56) References Cited

U.S. PATENT DOCUMENTS

| 7,073,066 B1 | 7/2006 | Nessett |
| 7,593,365 B1 | 9/2009 | Delker et al. |

(Continued)

FOREIGN PATENT DOCUMENTS

| CN | 101194471 A | 6/2008 |
| JP | 2007235494 A | 9/2007 |

(Continued)

OTHER PUBLICATIONS

International Search Report and Written Opinion—PCT/US2013/040979—ISA/EPO—Sep. 30, 2013.

*Primary Examiner* — Omar Ghowrwal
(74) *Attorney, Agent, or Firm* — Toler Law Group, PC

(57) ABSTRACT

Embodiments relate to systems and methods for an enhanced network handoff to wireless local area networks. A network element, referred to as a network handoff gateway (WHG), can be introduced between a wireless wide area network (WWAN) and a local wireless area network (WLAN). The WHG can maintain c links with both a set of WiFi™ or similar access points local to a wireless device, as well as a cellular network (or other WWAN) to which the device is registered. The wireless device can be tracked by the WHG using GPS or other data. The WHG can proactively acquire and pre-stage data needed to hand a data link of the wireless device off from the WWAN connection to the WiFi™ access points. The acquired data can include authentication information, IP address, or other information to facilitate a faster, more robust transition between the WWAN and WiFi™ or other WLAN connections.

116 Claims, 6 Drawing Sheets

(51) Int. Cl.
  *H04W 12/06* (2009.01)
  *H04W 36/08* (2009.01)
  *H04W 36/00* (2009.01)
  *H04W 88/16* (2009.01)
  *H04W 84/12* (2009.01)

(52) U.S. Cl.
  CPC ... *H04W 36/0061* (2013.01); *H04W 36/0066* (2013.01); *H04W 36/08* (2013.01); *H04W 84/12* (2013.01); *H04W 88/16* (2013.01)

(56) References Cited

U.S. PATENT DOCUMENTS

| | | | |
|---|---|---|---|
| 7,397,479 B2 | 4/2010 | Metke et al. | |
| 7,962,140 B2 | 6/2011 | Feng et al. | |
| 8,165,606 B2 | 4/2012 | Dunn et al. | |
| 8,180,349 B1 | 5/2012 | Mohan et al. | |
| 8,621,572 B2 | 12/2013 | Wang et al. | |
| 8,769,611 B2 | 7/2014 | Narayanan et al. | |
| 2002/0191627 A1 | 12/2002 | Subbiah et al. | |
| 2005/0002407 A1* | 1/2005 | Shaheen | H04L 12/5835 370/401 |
| 2005/0232200 A1* | 10/2005 | Jeong et al. | 370/331 |
| 2006/0046714 A1* | 3/2006 | Kalavade | 455/428 |
| 2006/0062183 A1 | 3/2006 | Forte et al. | |
| 2007/0249291 A1 | 10/2007 | Nanda et al. | |
| 2007/0259677 A1 | 11/2007 | Waxman | |
| 2008/0089305 A1 | 4/2008 | Yao et al. | |
| 2008/0096580 A1 | 4/2008 | Montemurro | |
| 2008/0316988 A1 | 12/2008 | Lee et al. | |
| 2009/0006821 A1* | 1/2009 | Mera et al. | 712/221 |
| 2009/0129341 A1* | 5/2009 | Balasubramanian et al. | 370/331 |
| 2009/0213819 A1 | 8/2009 | Kalhan | |
| 2009/0219888 A1* | 9/2009 | Chen | H04W 64/00 370/331 |
| 2009/0232096 A1 | 9/2009 | Taniuchi | |
| 2010/0105394 A1 | 4/2010 | Cheng et al. | |
| 2010/0272081 A1 | 10/2010 | Laroia et al. | |
| 2010/0323715 A1 | 12/2010 | Winters | |
| 2011/0249571 A1* | 10/2011 | Das | H04W 88/182 370/252 |
| 2012/0009899 A1 | 1/2012 | Karaoguz et al. | |
| 2012/0182935 A1 | 7/2012 | Addepalli et al. | |
| 2013/0177002 A1 | 7/2013 | Sun et al. | |
| 2013/0247150 A1* | 9/2013 | Cherian et al. | 726/4 |
| 2016/0037415 A1 | 2/2016 | Abraham et al. | |

FOREIGN PATENT DOCUMENTS

| | | |
|---|---|---|
| WO | 2007130800 A1 | 11/2007 |
| WO | 2009038831 A2 | 3/2009 |
| WO | 2010051046 A1 | 5/2010 |

* cited by examiner

SYSTEMS AND METHODS FOR ENHANCED NETWORK HANDOFF TO WIRELESS LOCAL AREA NETWORKS

RELATED APPLICATION

This application claims priority to U.S. Provisional Application No. 61/661,713, filed Jun. 19, 2012, entitled "Systems and Methods for Enhanced Network Handoff to Wireless Local Area Networks," by the same inventors herein, assigned or under obligation of assignment to the same entity as this application, and which application is incorporated herein by reference in its entirety.

FIELD

The present teachings relate to systems and methods for an enhanced network handoff to wireless local area networks. The present teachings more particularly relate to platforms and techniques for managing handoff events from a wireless device operating on a wireless wide area network to a wireless local area network through a wireless handoff gateway, where the wireless handoff gateway is configured to prepare the wireless device for fast association with wireless access points within local connection range.

BACKGROUND

In the field of telecommunications services, cellular carriers and other service providers have developed and deployed data networking services of steadily increasing speed and robustness. Smart phones and other devices capable of wide area network (WWAN) connections, such as cellular broadband data connections, can now routinely provide users with data rates in the range of hundreds of kilobytes per second, megabytes per second, or more. However, the consumption of relatively high-speed data services over the cellular network fabric faces constraints to both the user and service provider. From the user's point of view, many cellular and other subscriptions impose a cap or limit on data usage over a month or other time period, and exceeding those types of caps or limits can incur an overage cost. In addition, exceeding data caps can also cause the temporary downgrading of allowed data rates, or other constraints or effects.

From the perspective of the network service provider, providing a user with relatively high-speed data services can impose an increased occupancy load on the expensive licensed spectrum operated by the provider. The delivery of those data services can likewise increase the load on the core network of the service provider, reducing the total throughput available to additional voice, data, or other users.

Wireless local area networks (WLANs) such as WiFi™-based networks or others can provide smart phone users, or users of other devices, with a comparatively low-cost and widely-available alternative data connection through open routers or public access points. In addition, different WiFi™ implementations can deliver data rates that are comparable or greater than those available through the cellular network. WiFi™ connections using the IEEE 802.11ac standard can, for instance, achieve data rates of approximately 500 megabits per second, using 80 MHz bandwidth and two receiving antennas. Many smart phone and other devices today incorporate the capability to use either a WWAN or WLAN type of data connection.

However, generating a transition, on-the-fly, from a cellular data or other WWAN connection to a WiFi™ or other WLAN connection is presently not an easy transition to facilitate or perform. One of the notable challenges is that a significant delay can be imposed before the user can be securely moved from a WWAN connection to a WiFi™ or similar connection, which can interrupt the user experience, such as, merely for example, causing a lag or stoppage in a video data stream.

One of the factors contributing to the network-to-network handoff delay is the overhead that is needed to discover, authenticate, and transition the user from a cellular data connection to a WiFi™ connection, which in many cases must be selected from a potentially large number of WiFi™ channels. In aspects, the 5 GHz band used in current WiFi™ implementations can include over 20 possible channels to be searched. Once a selected WiFi™ channel is identified from among that collection of channels, the user next, in addition, needs to be authenticated. The authentication stage can include backhaul traffic to an authentication server and/or other authentication site or service, to ensure that the user is entitled to connect via the subject WiFi™ router or other access point. Depending on the keys, encryptions, and other techniques used, the authentication process can incur a significant processing delay, in itself. Even further, once a channel is selected and authentication is complete, the user's smart phone or other wireless device will typically require an assignment of an Internet protocol (IP) address for their WiFi™ session, a process which can impose additional processing overhead and delay.

It may be desirable to provide methods and systems for an enhanced network handoff to wireless local area networks, in which a wireless handoff gateway platform can be interposed in a wireless network environment, and speed and facilitate the association of a wireless device with a WiFi™ or other network, in part by pre-loading necessary device, access point, and network data before a handoff event takes place.

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Figure 1:
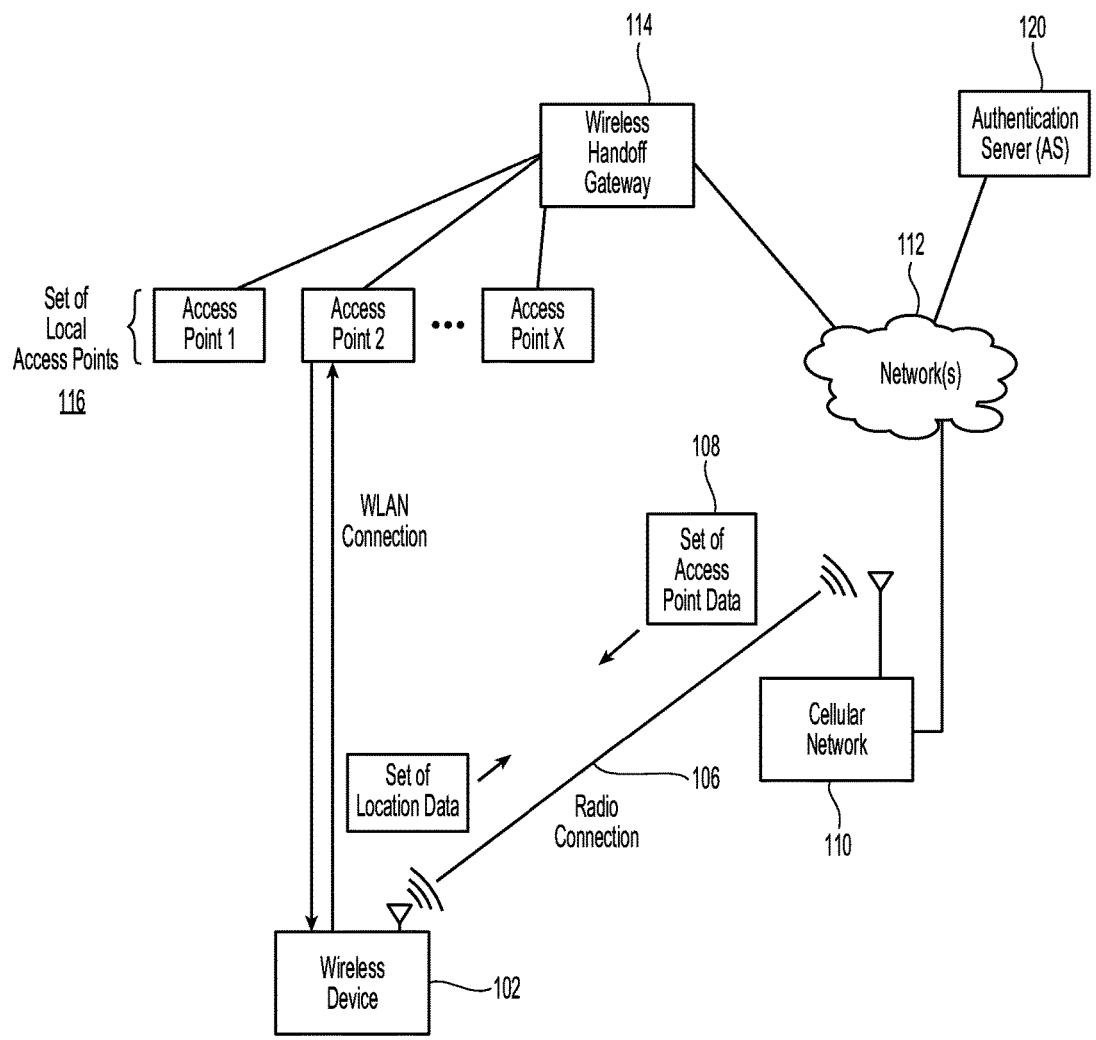
FIG. 1 illustrates an overall network environment which can be used in systems and methods for an enhanced network handoff to wireless local area networks, according to various embodiments.

Embodiments of the present teachings relate to systems and methods for an enhanced network handoff to wireless local area networks. More particularly, embodiments relate to platforms and techniques which can be implemented in a wireless network environment, in which a smart phone and/or other wireless or mobile device can travel while connected to a WWAN, such as a broadband cellular network. The wireless device can establish or maintain a data link, such as packet data service, to networks such as the Internet via the WWAN, using for example the Fourth Generation (4G) LTE (Long Term Evolution) wireless network standard. In implementations, while in transit, the position or location of the wireless device can be reported to, and tracked by, a platform or element introduced into the network fabric, referred to herein as a "wireless handoff gateway." The wireless handoff gateway (or WHG) can be or include a server, node, application, and/or service established in the WWAN to communicate with the wireless device. The wireless handoff gateway can likewise, in cases, be implemented in whole or part in a cloud-based network.

The wireless handoff gateway can perform a number of tasks to facilitate and accelerate the transition from a data connection in the WWAN to a data connection to a local WLAN. One of those tasks performed by the wireless handoff gateway is to identify one or more access points to a WLAN that are within connection range of the wireless device. The access point that is detected in the WLAN can be or include a WiFi™ router or other access point, but can also or instead be other types of devices or connections for either WiFi™ or other wireless local area networks. When available, access points are detected based on the position information for the smart phone or other wireless device, the wireless handoff gateway can begin a series of operations to acquire and authenticate the data that will be necessary to transition the wireless device from a data link connected through the WWAN, to a data link connect through a selected access point in the WLAN.

Those preparatory operations can include authentication stages, channel or signaling selection, the assignment of Internet protocol (IP) address information, and/or other operations required to hand the wireless device off from the WWAN to the WLAN. In part by acquiring the necessary data and pre-staging or loading those operations or data before the actual connection is established or fully activated, the wireless handoff gateway can facilitate handoff events, reduce overhead processing and delays, and increase the perceived responsiveness of the network-to-network switching process by the user of the wireless device. In aspects, that transition can take place with little or no perceived lag or interruption, by the user or the wireless device.

Reference will now be made in detail to exemplary embodiments of the present teachings, which are illustrated in the accompanying drawings. Where possible the same reference numbers will be used throughout the drawings to refer to the same or like parts.

FIG. 1 illustrates an overall network environment 100 in which systems and methods for an enhanced network handoff to wireless local area networks can operate, according to aspects. In aspects as shown, a wireless device 102 can communicate with a cellular network 110 via a radio connection 106. In aspects, the wireless device 102 can be or include a cellular telephone, a smart phone, a portable computer, a tablet device, a media player device, a global positioning system (GPS) device, a personal digital assistant (PDA) device, a laptop computer, and/or other network-enabled, mobile and/or or wireless device or platform. In aspects, the radio connection 106 can be or include one or more wireless connections or channels, such as, merely for example, a WiMax™ channel or connection, a CDMA (code division multiple access) channel or connection, TMDA (time division multiple access) channel or connection, a 3G, 4G, and/or other channel or connection using LTE (long term evolution) industry standards, and/or channel, connection, or communications link. The cellular network 110 can be or include, for example, a set of hardware, software, radio frequency, and/or other resources or services deployed for the purposes of supporting voice communications, text communications, broadband data links, and/or other proprietary or other services over licensed spectrum or other radio frequency bands, channels, connections, or ranges.

According to aspects, the cellular network 110 can also be connected to one or more networks 112, such as the Internet and/or other public or private networks. The cellular network 110 can connect to the one or more networks 112 via optical and/or other high-speed connections, edge or core servers, and/or other transmission connections, relays, or links. The network environment 100 can likewise include a wireless handoff gateway 114, which can also be connected to the one or more networks 112 via one or more transmission links, and/or to other networks, layers, and/or channels. In aspects, it may be noted that the wireless handoff gateway 114 can likewise be connected or have access to the authentication server (AS) 120 that supports or services authentication protocols and operations for the wireless device 102, among other resources. It may be noted that in general, in implementations, the wireless handoff gateway 114 and/or other logic, platforms, elements, or services can access or interface to the authentication server 120 at any time during operation of platforms and techniques described herein, to authenticate users, devices, and/or other entities using known and/or publicly available authentication techniques, as appropriate.

It may be noted that in aspects, in cases where the wireless device 102 can not establish or maintain a data connection to or through the cellular network 110, the wireless device 102 can be configured to communicate with the wireless handoff gateway 114 using alternative channels, connections, or services, such as the short messaging service (SMS) and/or others. For further example, extensions to the SIP (session initiation protocol) can likewise be used for signaling between the wireless device 102 and the wireless handoff gateway 114.

The wireless handoff gateway 114 can be configured and/or provisioned to perform a number of management tasks in connection with the delivery of data link services to the wireless device 102. In aspects, the wireless handoff gateway 114 can be configured to receive a set of location data 104 from the wireless device 102. In aspects, the set of location data 104 can be or include geographical or other position data, such as, the latitude and/or longitude of the wireless device 102, the speed and direction of the wireless device 102, acceleration of the wireless device 102, altitude of the wireless device 102, bearing of the wireless device 102, and/or other positional or location data or information. In aspects, additional location information can include cellular network information such as PLMN ID, base station ID, pilot PN, SID, NID, and/or other information that can be used to locate the wireless device 102 via techniques other than GPS-based techniques, such as base station mapping or signal triangulation. For instance, relative signal strengths of different base stations can also be used as a means to determine the location of the wireless device 102. In aspects, the set of location data 104 can be reported from the wireless device 102 to the wireless handoff gateway 114 using data acquired from an onboard or integrated GPS (Global Positioning System) receiver. In aspects, the set of location data 104 can, as noted, also or instead be generated or reported using other techniques, such as pilot measurements from a neighboring base station in the cellular network 110, using geographic cell identifiers in the cellular network 110, and/or other positioning platforms, techniques, and/or services, such as Doppler effect data. In aspects, the wireless device 102 can report the set of location data 104 to the wireless handoff gateway 114 via the radio link 106, cellular network 110, one or more networks 112, and/or other channels, links, or connections. The information can for instance be exchanged over a direct data connection between the wireless device 102 and the wireless handoff gateway 114 using TCP/IP (transmission control protocol/Internet protocol), and/or over http (hyper text transfer protocol).

In aspects, the reporting and updating of the set of location data 104 can also or instead be performed using a secure link from the wireless device 102 to the wireless handoff gateway 114, which can be or include a secure link over the top of the cellular service provided by the cellular network 110. For instance, the set of location data 104 can be reported to the wireless handoff gateway 114 via the cellular network 110 using an https (hyper text transfer protocol secure), and/or other layer, connection, or link. Other secure layers or links can be used, such as, for instance, a virtual private network (VPN) link, a transport layer security (TLS) link, and/or other links, channels, and/or layers.

According to aspects, the frequency with which the set of location data 104 is reported to the wireless handoff gateway 114 can be fixed, and/or can vary, and can be configured to be dependent on selected factors. For instance, the frequency with which the set of location data 104 is updated and/or reported to the wireless handoff gateway 114 can be configured to depend on the speed of movement of the wireless device 102. When speed is used as a triggering criteria, slower detected speeds can cause a lower rate of updating to be used, with higher speeds causing a higher rate of updating. Below certain speeds, the wireless device 102, wireless handoff gateway 114, and/or other hardware or resources can be configured to stop sending updates of the wireless handoff gateway 114. A stop or interruption of location reporting can for instance be imposed when the wireless device 102 is moving too fast, such as above pedestrian speeds or other thresholds. A stop or interruption of location reporting can likewise be imposed when the wireless device 102 is determined to have stopped moving for a predetermined period of time, so that the wireless device 102 is assumed to be at rest. Other techniques, rates, and/or factors can be used to schedule the updating and/or reporting of the set of location data 104 to the wireless handoff gateway 114.

At various times, and as likewise shown in FIG. 1, while in transit, the wireless device 102 can enter the proximity of a set of local access points 116. The set of local access points 116 can be or include wireless routers, switches, hubs, and/or other hardware, receivers, nodes, and/or services capable of connecting a wireless or mobile device to a wireless local area network (WLAN), such as a WiFi™ network operation under the IEEE (Institute of Electrical and Electronics Engineers) 802.11 family or other of standards. According to aspects, the set of local access points 116 can be or include a set of WiFi™ routers with which the wireless device 102 has reached, and/or is approaching, radio connection range. According to aspects, the set of local access points 116 can initially detect and/or communicate with the wireless device 102 using a set of transmitted beacon information, and/or other signals. In aspects, any one or more devices in the set of local access points 116 can be configured to provide a data link to the one or more networks 112, allowing the set of local access points 116 to provide an alternative communication link to the one or more networks 112, instead of the cellular network 110 acting as a WWAN. The wireless handoff gateway 114 can, in aspects, be configured to initiate those types of handoff events from the cellular network 110 to the set of local access points 116, and/or other nodes or access points.

The wireless handoff gateway 114 can, more particularly, be configured to process and analyze the set of location data 104, a set of station data 118, and/or other associated information, and identify the set of local access points 116 in proximity or vicinity of the wireless device 102 for potential data link handoff. According to aspects, the wireless handoff gateway 114 can determine the proximity of the wireless device 102 to the set of local access points 116 using, for example, database records, directories, maps, location services, and/or other sources recording the location of WiFi™ and/or other access points or nodes. Once the wireless handoff gateway 114 has identified one or more wireless routers and/or other access points located within proximity of the wireless device 102, the wireless handoff gateway 114 can access, retrieve, filter, and/or otherwise process a set of access point data 108 associated with the set of local access points 116, as well as other information, for purposes of preparing and managing a handoff event from the cellular network 110 to the set of local access points 116.

In aspects, the set of access point data 108 can be or include a set of information such as the service set identification (SSID) information for available access points in the set of local access points 116, the WiFi™ channel or channels of operation of those available access points, the media access control (MAC) address of the available access points, any key or keys used for encryption, authentication, and/or other security processing or protocols including fast authentication protocols, and/or a pre-assigned Internet protocol (IP) address for the wireless device 102, acting as a station in a WiFi™ network provided by the set of local access points 116. The set of access point data 108 can, further, also be or include information such as an identification of the services provided by any one or more access points in the set of local access points 116, any cost of access through the set of local access points 116, and/or other information that is needed to perform an association process between the wireless device 102 and one or more access points in the set of local access points 116.

According to aspects, after accessing, retrieving, and organizing the set of access point data 108, the wireless handoff gateway 114 can transmit that data to the wireless device 102 via the cellular network 110, radio connection 106, and/or other networks or channels, to prepare the wireless device 102 for association with one or more access points in the set of local access points 116.

In possession of the set of location data 104, the radio connection 106, and/or other associated information, the wireless handoff gateway 114 likewise or instead perform and/or initiate operations to stage and prepare the set of local access points 116 for contact by, and association or registration of, the wireless device 102 to the WiFi™ and/or other networks supported by the set of local access points 116. According to aspects, the wireless handoff gateway 114 can transmit a set of station data 118 to the set of local access points 116, to pre-load the set of local access points 116 with information necessary to register and associated the wireless device 102. The set of station data 118 can include information such as one or more authentication, encryption, and/or other security keys for quick identification of the wireless device 102 to each of the access points in the set of local access points 116. In aspects, the set of key information pushed to the set of local access points 116 can be or include a temporary key generated by the wireless handoff gateway 114 itself, and/or other keys or data, such as temporary or permanent keys already associated with the wireless device 102 and/or user of the device. Receipt of advance key information as part of the set of station data 118 can permit the one or more access points to which a connection is made to authenticate the wireless device 102 relatively quickly.

Besides information related to security keys, the wireless handoff gateway 114 can in addition initiate an IP address assignment procedure for the wireless device 102 at one or more of the access points in the set of local access points 116. Again, the IP address to be assigned to the wireless device 102 can be generated and/or provided by the wireless handoff gateway 114 itself, by the wireless device 102 itself, a network service provider, and/or by other nodes, services, and/or sources. The wireless handoff gateway 114 can also inform the wireless device 102 (acting as a station, STA) whether the device can continue to use the same IP address it currently has in use, or whether it needs to request a new IP address. In addition, the wireless handoff gateway 114 may allocate the IP address for the wireless device 114 (acting as a station, STA) and send it to the wireless device 102, using the data connection setup over the cellular network 110 before the wireless device 102 has transitioned to a data connection via the set of local access points 116.

According to aspects, in general and as noted, the wireless handoff gateway 114 can receive the set of location data 104, the set of station data 118, the set of access point data 108, and/or other associated information, and use that data to conduct and/or initiate a set of operations by itself and/or in conjunction with the wireless device 102 and/or set of local access points 116 to enhance the speed, robustness, transparency, reliability, and security of a handoff event to transition the wireless device 102 from a data connection through the cellular network 110 to a data connection through the set of local access points 116. In aspects, once the wireless device 102 has received the set of access point data 108 and/or other information, the wireless device 102 can initiate a set of operations to prepare itself for connection to one or more access point in the set of local access points 116. In aspects, the wireless device 102 can for instance perform an active or passive scan on the WLAN channels identified in the set of access point data 108, to determine if any one or more of the access points identified in the set of access point data 108 is available for registration.

According to aspects, by restricting or initially restricting the channel scan to only those available access points identified by the wireless handoff gateway 114 in the set of access point data 108, the wireless device 102 can avoid performing an exhaustive search of all active channels of some or all of the access points in the set of local access points 116. It may be noted that an active/passive scan may be required if the wireless device 102 does not already have the MAC (media access control) address of the access point or points with which it wishes to communicate within the set of local access points 116.

In aspects, the wireless device 102 can also or instead be configured to directly proceed to an association request with one or more of the available access points identified in the set of access point data 108. In those cases, an active/passive scan process can be omitted. In aspects, once a target access point is identified or selected, the wireless device 102 and the one or more access points identified in the set of access point data 108 can perform a mutual authentication process. Authentication can include the verification of possession by one or both devices of a key or keys obtained or received from the wireless handoff gateway 114. In implementations, the fast authentication process performed by or between the wireless device 102 and the selected access point or points in the set of local access points 116 can be or include the Otway Rees protocol, designed for insecure network transactions, and/or the Extensible Authentication Protocol Re-Authentication (ERP) authentication protocols. In another embodiment, the keys may be distributed using PMK Key caching techniques. It will however be appreciated that other authentication algorithms, techniques, and/or protocols can be used. It may be noted that in implementations, the processing carried out by the wireless device 102 can be performed by a software application installed on the wireless device 102, which can be installed and used without any changes required to the operating system or other software of the wireless device 102.

In addition to processing performed or initiated by the wireless device 102, conversely, the access point(s) in the set of local access points 116 can likewise perform a set of operations to prepare for the handoff of the data link of the wireless device 102 to the set of local access points 116. In aspects, when one or more access points in the set of local access points 116 receive data from the wireless handoff gateway 114 associated with the wireless device 102, the access point(s) can receive and store a set of handoff information, including the set of station data 118 for the wireless device 102 received from the wireless handoff gateway 114. The set of station data 118 for the wireless device 102 provided by the wireless handoff gateway 114 can be or include, for instance, information associated with the registration and connection of the wireless device 102 to the set of access points 106, such as the media access control (MAC) address of the wireless device 102, as well as any key information associated with the wireless device 102 that can be used for a fast authentication process between the access point(s) and the wireless device 102.

The set of station data 118 received by the access point(s) can also include an assigned Internet protocol (IP) address for the wireless device 102, if that data is likewise included in the information sent by the wireless handoff gateway 114. It will be appreciated that other information related to or associated with the wireless device 102 can be transmitted in the set of station data 118 received by the access point(s) in the set of local access points 116. That data can include additional or other data besides key data or address data, including data that is in addition to that required or permitted under the WiFi™ networking standards.

In implementations, the access point or points which receive the set of station data 118 or other information about the wireless device 102 can be configured to delete that information if the wireless device 102 does not attempt to initiate an association with the access point after a predetermined timeout period, for security and other reasons.

Figure 2:
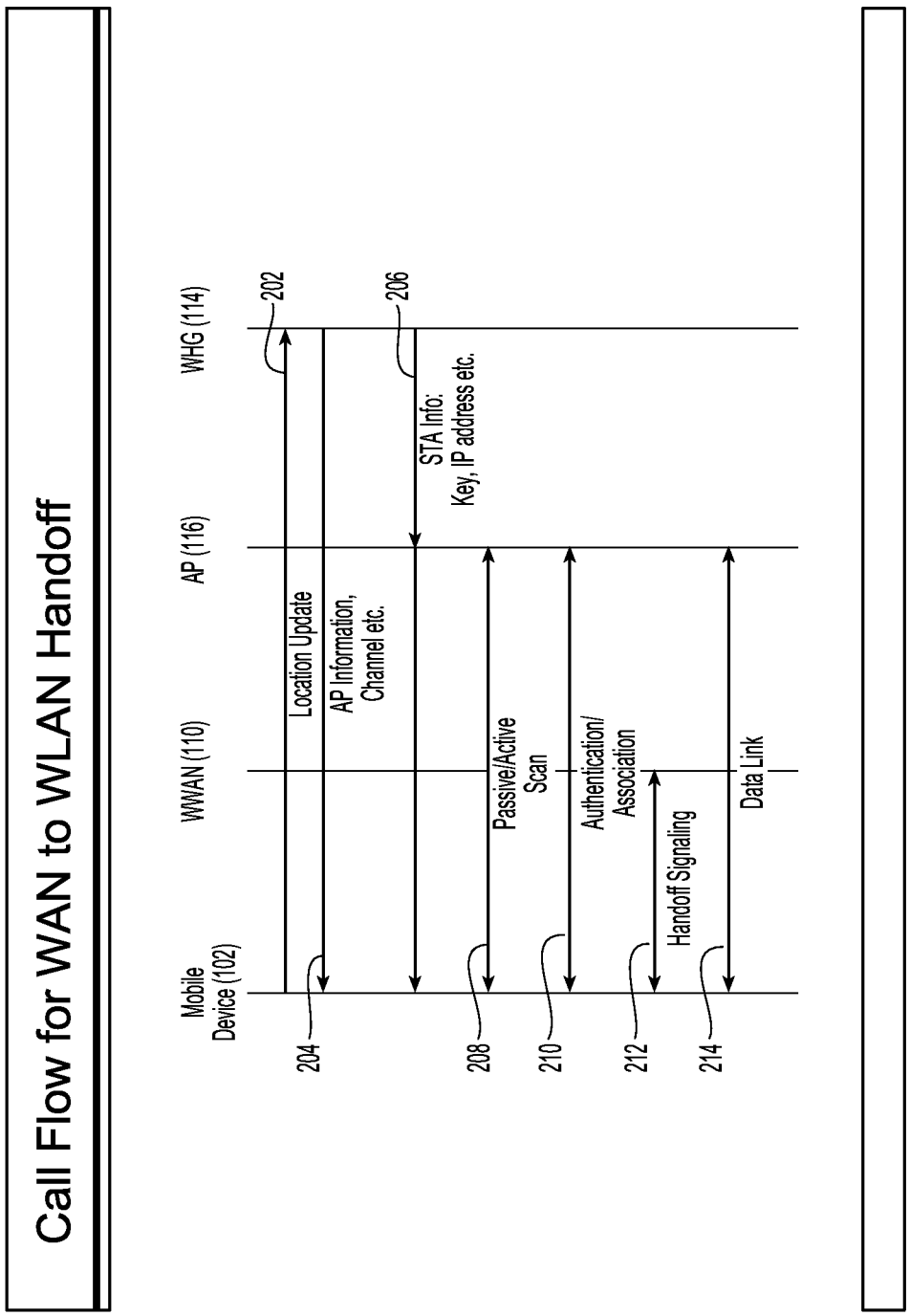
FIG. 2 illustrates a diagram of network elements and a flowchart of a call flow between those elements, according to various embodiments.

Overall call flow and processing operations for systems and methods for an enhanced network handoff to wireless local area networks are illustrated in FIG. 2. In 202, the wireless device 102 can communicate with the wireless handoff gateway 114, for instance via an https (hyper text transfer protocol secure) and/or other secure channel, connection, or layer, to transmit a set of location data 104 for the wireless device 102 to the wireless handoff gateway 114. In 204, the wireless handoff gateway 114 can transmit the set of access point data 108 to the wireless device 102, including access point ID, active or available channel, service set identification (SSID), and/or other information. In 206, the wireless handoff gateway 114 can transmit a set of station data 118 including authentication key, Internet protocol (IP) address information, and/or other data related to the wireless device 102 to one or more access points in the set of local access points 116.

In 208, an active/passive scan process can be carried out between the wireless device 102 and the access point(s) in the set of local access points 116, to determine which one or more of the access points in the set of local access points 116 is available to accept association of the wireless device 102. In 210, an authentication and/or association process or processes can be carried out between the wireless device 102 and the access point(s) in the set of local access points 116. As noted, the authentication process can be or include the Otway Rees protocol, the Extensible Authentication Protocol Re-Authentication (ERP) authentication protocol, and/or other protocols, processes, services, or standards.

In 212, a set of handoff signaling operations can be performed between the wireless device 102 and the cellular network 110 and/or other wireless wide area network to which the wireless device 102 is registered and/or communication. For instance, the wireless device 102 can request that the state or context of any current data transfers, services, and/or applications be preserved, in anticipation of the handoff transaction.

In 214, a data link can be established between the wireless device 102 and an access point or points in the set of local access points 116, and the wireless device 102 can begin to transmit and/or receive data from the network or networks to which the set of local access points 116 is connected, such as the Internet or others. Processing can then repeat, return to a prior processing point, jump to a further processing point, or end.

Figure 3:
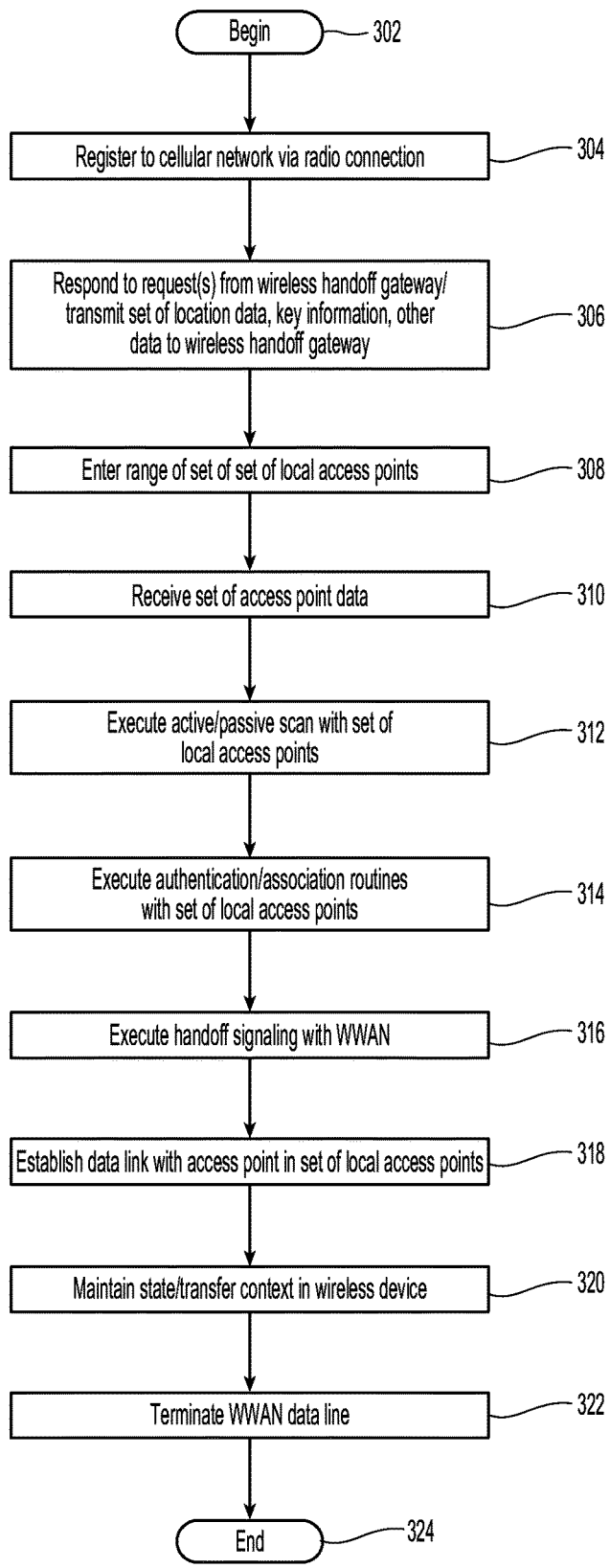
FIG. 3 illustrates a flowchart of data connection handoff processing, in certain regards.

FIG. 3 illustrates various processing operations that can be carried out in WWAN and WLAN networks, including data exchanges and processing carried out by the wireless device 102, according to implementations. In 302, processing can begin. In 304, the wireless device 102 can register to the cellular network 110 via the radio connection 106, and/or other connections, links, or channels. In 306, the wireless device 102 can respond to one or more requests from the wireless handoff gateway 114 and transmit a set of information including, for instance, a set of location data 104, a set of station data 118 including key information, IP address information, MAC information, QoS information and/or other information or data to the wireless handoff gateway 114. In 308, the wireless device 102 can enter the range of a set of local access points 116, such as by arriving at an airport, train station, restaurant, or other commercial site, for instance with the wireless device 102 being carried to those or other locations, while walking, bicycling, riding in a vehicle, or otherwise transiting to within range of the set of local access points 116.

In 310, the wireless device 102 can receive a set of access point data 108 from the wireless handoff gateway 114, for instance, via the existing connection with the cellular network 110. In 312, the wireless device 102 can execute an active passive scan process with the set of local access points 116, for instance, using the set of access point data 108 received from the wireless handoff gateway 114. In 314, the wireless device 102 can execute one or more authentication and/or association routines, for instance by interacting with the wireless handoff gateway 114 and using the authentication server 120 to verify key information. In 316, the wireless device 102 can execute handoff signaling with the cellular network 110 and/or other WWAN. In aspects, handoff signaling can be or include instructions to preserve or forward the context or state of data transfers, services, applications, and/or other processes taking place on the wireless device 102. In implementations, the handoff signaling can likewise include requests to forward metering, billing, and/or other usage information from the cellular network 110, one or more networks 112, and/or other entities, networks, or services to the wireless device 102, wireless handoff gateway 114, and/or other destination In 318, the wireless device 102 can establish a data link with an access point or points in the set of local access points 116, for instance, by way of a WiFi™ association with that device or devices. In 320, the wireless device 102, wireless handoff gateway 114, and/or other device, service, and/or logic can maintain or store the state of the wireless device 102 and any running applications, services, or transfers, and/or transfer the context for those processes to the access point(s) to which the wireless device 102 is now connected. In 322, the data link and/or other connection from the cellular network 110 or other WWAN to the wireless device 102 can be terminated. In 324, processing can repeat, jump to a prior processing point, jump to a further processing point, or end.

Figure 4:
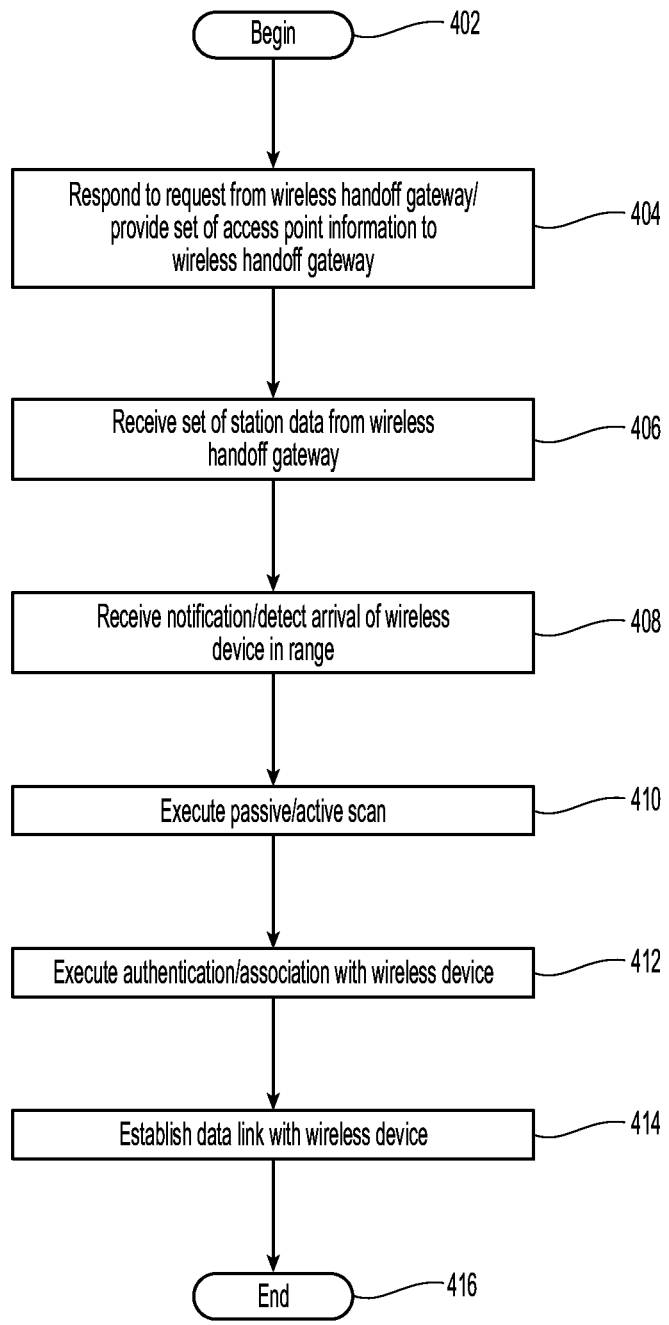
FIG. 4 illustrates a flowchart of data connection handoff processing, in certain further regards.

FIG. 4 illustrates various processing operations that can be carried out in WWAN and WLAN networks, including data exchanges and processing carried out by the set of local access points 116 according to implementations. In 402, processing can begin. In 404, one or more access points in the set of local access points 116 can respond to a request from the wireless handoff gateway 114 and transmit a set of access point data 108 to the wireless handoff gateway 114. The set of access point data 108 can be or include, as noted, various information such as service set identification (SSID) information describing services available from the set of local access points 116, WiFi™ or other channel usage information, security key or protocol information, media address or other address information, and/or other data.

In 406, the set of local access points 116 can receive the set of station data 108 from the wireless handoff gateway 114, pre-staging some or all information that will be necessary to associated the wireless device 102 with one or more access points in the set of local access points 116. That information can include for instance an identification of that device, IP address of the wireless device 102, data context information for the wireless device 102, and/or other information. In 408, the set of local access points 116 can receive a notification and/or detect the arrival or approach of the wireless device 102 within local radio range. In 410, the set of local access points 116, in conjunction with the wireless device 102, can perform an active/passive scan of available channels in the set of local access points 116. In 412, the set of local access points 116, in conjunction with the wireless device 102, can perform one or more authentication and/or association processes for the wireless device 102. In 414, the selected access point(s) can establish a data connection with the wireless device 102, such as by establishing an assigned WiFi™ channel for the device. In 416, processing can repeat, jump to a prior processing point, jump to a further processing point, or end.

Figure 5:
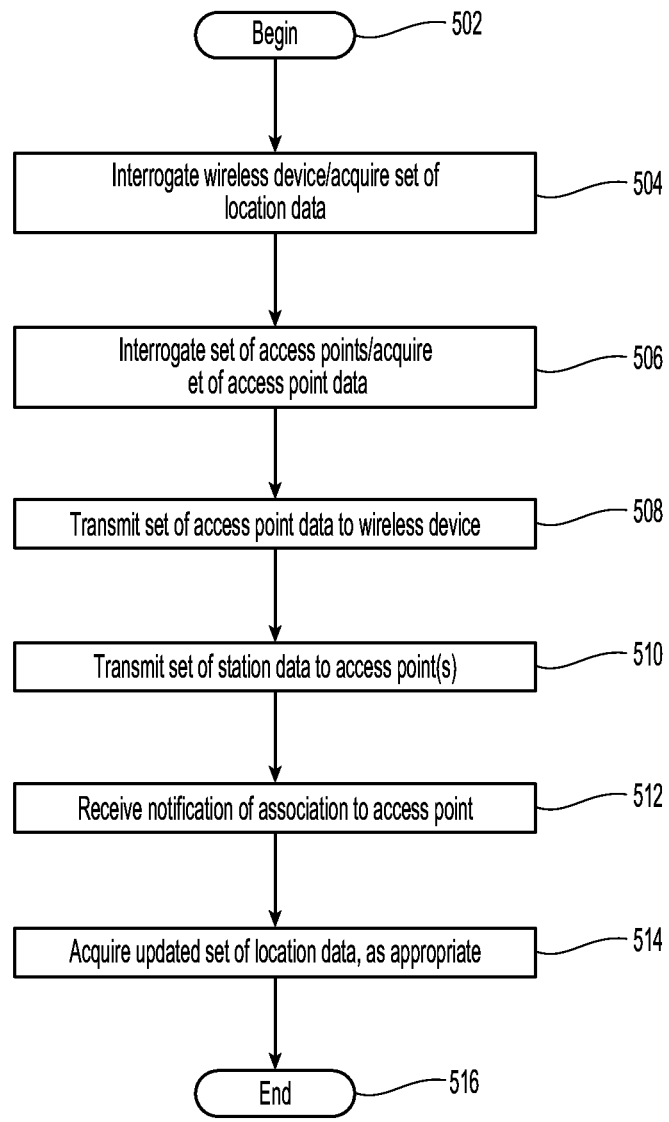
FIG. 5 illustrates a flowchart of data connection handoff processing, in certain additional regards.

FIG. 5 illustrates various processing operations that can be carried out in WWAN and WLAN networks, including data exchanges and processing carried out by the wireless handoff gateway 114, according to implementations. In 502, processing can begin. In 504, the wireless handoff gateway 114 can interrogate the wireless device 102 and acquire a set of location data 102, such as GPS or other data, via the cellular network 110, one or more networks 112, and/or other channels, networks, or connections. In 506, the wireless handoff gateway 114 can interrogate the set of local access points 116, and acquire a set of access point data 108, for instance, via the one or more networks 112, and/or other channels or connections. In 508, the wireless handoff gateway 114 can transmit the set of access point data 108 to the wireless device 102, for instance via the cellular network 110. In 510, the wireless handoff gateway 114 can transmit the set of station data 118 to the set of local access points 116. In 512, the wireless handoff gateway 114 can receive a notification that the wireless device 102 has associated with one or more access points in the set of local access points 116. In 514, the wireless handoff gateway 114 can acquire an updated set of location data 104 and/or other information for the wireless device 102, for instance, when the wireless device 102 has terminated its WiFi™ session with the set of local access points 116. In 516, processing can repeat, jump to a prior processing point, jump to a further processing point, or end.

Figure 6:
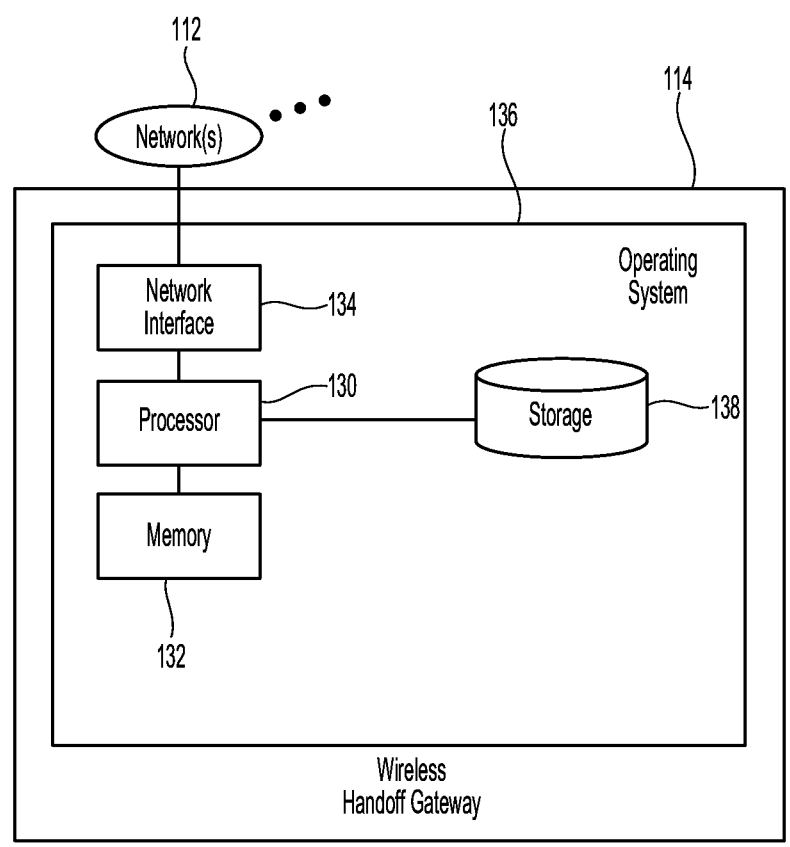
FIG. 6 illustrates exemplary hardware, software, and other resources that can be used in a wireless handoff gateway used in systems and methods for an enhanced network handoff to wireless local area networks, according to various embodiments.

FIG. 6 illustrates various hardware, software, and other resources that can be used in implementations of systems and methods for enhanced network handoff to wireless local area networks, according to embodiments. In embodiments as shown, the wireless handoff gateway 114 can comprise a platform including processor 130 communicating with memory 132, such as electronic random access memory, operating under control of or in conjunction with an operating system 136. The processor 130 in embodiments can include or can be incorporated in one or more servers, clusters, and/or other computers or hardware resources, and/or can be implemented using cloud-based resources. The operating system 136 can be, for example, a distribution of the Linux™ operating system, the Unix™ operating system, or other open-source or proprietary operating system or platform. The processor 130 can communicate with the storage 138, such as a database stored on a local hard drive or drive array, to access or store data related to the management of handoff operations as described herein, including location information and/or association data, and/or subsets of selections thereof, along with other content, media, or other data. The processor 130 can further communicate with a network interface 134, such as an Ethernet or wireless data connection, which in turn communicates with the one or more networks 112, such as the Internet or other public or private networks. The processor 130 can, in general, be programmed or configured to execute control logic and to control various processing operations, including to generate, manage, process, and/or distribute the set of location data 104, the set of access point data 108, the set of station (STA) and/or other data related to association of the wireless device 102 with the set of local access points 116, and/or other data or information. In aspects, it may be noted that the wireless device 102, along with the individual access points in the set of local access points 116, as well as servers and/or other nodes or resources of the cellular network 110, can be or include resources similar to those of the wireless handoff gateway 114, and/or can include additional or different hardware, software, and/or other resources. Other configurations of the wireless handoff gateway 114, the wireless device 102, the cellular network 110, the set of local access points 116, associated network connections, and other hardware, software, and service resources are possible.

The foregoing description is illustrative, and variations in configuration and implementation may occur to persons skilled in the art. For example, while embodiments have been described in which a single wireless handoff gateway 114 services one wireless device 102 and one set of local access points 116, in implementations, two or more wireless handoff gateways 114 can support the wireless device 102 and the set of local access points 116. Conversely, in implementations, one, two, or more wireless handoff gateways 114 can communicate with and support two or more wireless devices 102, and/or two or more separate sets of local access points 116. Similarly, while implementations have been described which utilize the WiFi™ standard for wireless local area network operations, in implementations, other networks which employ other wireless standards or protocols can be used in addition or instead of a WiFi™ network deployment. Other resources described as singular or integrated can in embodiments be plural or distributed, and resources described as multiple or distributed can in embodiments be combined. The scope of the present teachings is accordingly intended to be limited only by the following claims.

What is claimed is:

1. A method of managing a wireless device, the method comprising:
   receiving, from a wireless wide area network interface, a set of location information associated with the wireless device;
   identifying, using the set of location information, a set of access points that are within connection range of the wireless device;
   transmitting a set of access point information associated with the set of access points to the wireless device via the wireless wide area network interface;
   transmitting a set of station information associated with the wireless device to at least one access point in the set of access points; and
   initiating a handoff of the wireless device from the wireless wide area network interface to a wireless local area network interface based on the set of access point information and based on transmitting the set of station information to the at least one access point.

2. The method of claim 1, wherein the wireless wide area network interface comprises a cellular network interface.

3. The method of claim 2, wherein the cellular network interface is configured to connect to at least one network via a cellular broadband data connection.

4. The method of claim 1, wherein the wireless local area network interface is configured to connect to the Internet via a wireless router.

5. The method of claim 1, wherein the wireless device comprises at least one of a cellular telephone, a smart phone, a portable computer, a tablet device, a media player device, a global positioning system (GPS) device, or a personal digital assistant (PDA) device.

6. The method of claim 1, wherein the set of station information comprises station (STA) information associated with the wireless device.

7. The method of claim 6, wherein the STA information comprises at least one of address information associated with the wireless device or key information associated with the wireless device.

8. The method of claim 1, wherein the set of access point information comprises at least one of address information associated with the at least one access point, a set of channel information associated with the at least one access point, a set of service set identification (SSID) information associated with the at least one access point, or cost information for data link access through the at least one access point.

9. The method of claim 1, further comprising transmitting a set of security key information to the wireless device and the at least one access point.

10. The method of claim 9, further comprising initiating an authentication process between the wireless device and the at least one access point based on the set of security key information.

11. The method of claim 1, wherein the set of location information comprises at least one of location information captured via global position system (GPS) data, base station pilot data, geographic cell identifier data, cellular network data, Doppler effect data, or signal strength data.

12. The method of claim 1, wherein at least one of receiving a set of location information, transmitting a set of access point information, or transmitting a set of station information comprises initiating a transmission over a secure transmission link with the wireless device.

13. A system, comprising:
a wireless wide area network interface configured to communicate with a wireless device;
a wireless local area network interface configured to communicate with the wireless device; and
a processor coupled to the wireless wide area network interface and to the wireless local area network interface, the processor configured to:
communicate using at least one of the wireless wide area network interface and the wireless local area network interface,
receive, from the wireless wide area network interface, a set of location information associated with the wireless device,
identify, using the set of location information, a set of access points that are within connection range of the wireless device,
transmit, via the wireless wide area network interface, a set of access point information associated with the set of access points to the wireless device, the set of access point information identifying to the wireless device a plurality of the access points,
transmit a set of station information associated with the wireless device to at least one access point in the set of access points, and
initiate a handoff of the wireless device from the wireless wide area network interface to the wireless local area network interface based on the set of access point information and based on the transmission of the set of station information to the at least one access point.

14. The system of claim 13, wherein the wireless wide area network interface is configured to communicate with a wireless wide area network, and wherein the wireless wide area network includes a wireless handoff gateway circuit that includes the processor and a memory coupled to the processor.

15. The system of claim 13, wherein the wireless wide area network interface comprises a cellular network interface.

16. The system of claim 13, wherein the processor is further configured to receive a short messaging service (SMS) message from the wireless device, and wherein the wireless local area network interface comprises a WiFi™ technology network interface.

17. The system of claim 13, wherein the wireless device comprises at least one of a cellular telephone, a smart phone, a portable computer, a tablet device, a media player device, a global positioning system (GPS) device, or a personal digital assistant (PDA) device.

18. The system of claim 13, wherein the set of station information comprises station (STA) information associated with the wireless device, and wherein the processor is further configured to communicate with the wireless device via a short messaging service (SMS) message.

19. The system of claim 18, wherein the STA information comprises at least one of address information associated with the wireless device or key information associated with the wireless device.

20. The system of claim 13, wherein the set of access point information comprises at least one of address information associated with the at least one access point, a set of channel information associated with the at least one access point, a set of service set identification (SSID) information associated with the at least one access point, or cost information for data link access through the at least one access point.

21. The system of claim 13, wherein the processor is further configured to transmit a set of security key information to the wireless device and the at least one access point.

22. The system of claim 21, wherein the processor is further configured to initiate an authentication process between the wireless device and the at least one access point based on the set of security key information.

23. The system of claim 13, wherein the set of location information comprises at least one of location information captured via global position system (GPS) data, base station pilot data, geographic cell identifier data, cellular network data, Doppler effect data, or signal strength data.

24. The system of claim 13, wherein at least one of the receipt of a set of location information, the transmission of a set of access point information, or the transmission of a set of station information comprises an initiation of a transmission over a secure transmission link with the wireless device.

25. A system, comprising:
means for communicating via a wireless wide area network;
means for communicating via a wireless local area network; and
means for processing information, the means for processing information coupled to the means for communicating via a wireless wide area network and to the means for communicating via a wireless local area network, the means for processing information configured to:
communicate using at least one of the means for communicating via a wireless wide area network and the means for communicating via a wireless local area network, and
receive, from the means for communicating via a wireless wide area network, a set of location information associated with a means for communicating wirelessly,
identify, using the set of location information, a set of means for providing access that are within connection range of the means for communicating wirelessly,
transmit, via the means for communicating via a wireless wide area network, a set of access point information associated with the set of means for providing access to the means for communicating wirelessly, the set of access point information identifying to the means for communicating wirelessly a plurality of the means for providing access,
transmit a set of station information associated with the means for communicating wirelessly to at least one means for providing access in the set of means for providing access, and
initiate a handoff of the means for communicating wirelessly from the means for communicating via a wireless wide area network to the means for communicating via a wireless local area network based on the set of access point information and based on the transmission of the set of station information to the at least one means for providing access.

26. The system of claim 25, wherein the means for communicating via a wireless wide area network includes a wireless handoff gateway circuit that includes the means for processing information and a memory coupled to the means for processing information.

27. The system of claim 25, wherein the means for communicating via a wireless wide area network comprises means for communicating via a cellular network interface.

28. The system of claim 25, wherein the means for communicating via a wireless local area network comprises means for communicating via a WiFi™ technology network interface.

29. The system of claim 25, wherein the means for communicating wirelessly comprises at least one of a cellular telephone, a smart phone, a portable computer, a tablet device, a media player device, a global positioning system (GPS) device, or a personal digital assistant (PDA) device.

30. The system of claim 25, wherein the set of station information comprises station (STA) information associated with the means for communicating wirelessly.

31. The system of claim 30, wherein the STA information comprises at least one of address information associated with the means for communicating wirelessly or key information associated with the means for communicating wirelessly.

32. The system of claim 25, wherein the set of access point information comprises at least one of address information associated with the at least one means for providing access, a set of channel information associated with the at least one means for providing access, a set of service set identification (SSID) information associated with the at least one means for providing access, or cost information for data link access through the at least one means for providing access.

33. The system of claim 25, wherein the means for processing information is further configured to transmit a set of security key information to the means for communicating wirelessly and the at least one means for providing access.

34. The system of claim 33, wherein the means for processing information is further configured to initiate an authentication process between the means for communicating wirelessly and the at least one means for providing access based on the set of security key information.

35. The system of claim 25, wherein the set of location information, comprises at least one of location information captured via global position system (GPS) data, base station pilot data, geographic cell identifier data, cellular network data, Doppler effect data, or signal strength data.

36. The system of claim 25, wherein at least one of the receiving of a set of location information, the transmitting of a set of access point information, or the transmitting of a set of station information comprises an initiation of a transmission over a secure transmission link with the means for communicating wirelessly.

37. A computer program product, comprising:
a non-transitory computer-readable medium comprising instructions executable by a processor to initiate operations comprising:
receiving, from a wireless wide area network interface, a set of location information associated with a wireless device,
identifying, using the set of location information, a set of access points that are within connection range of the wireless device,
transmitting a set of access point information associated with the set of access points to the wireless device via the wireless wide area network interface, the set of access point information identifying to the wireless device a plurality of the access points,
transmitting a set of station information associated with the wireless device to at least one access point in the set of access points, and
initiating a handoff of the wireless device from the wireless wide area network interface to a wireless local area network interface based on the set of access point information and based on the transmitting of the set of station information to the at least one access point.

38. The computer program product of claim 37, wherein the wireless wide area network interface is configured to communicate with a wireless wide area network, and wherein the wireless wide area network includes a wireless handoff gateway circuit that includes the processor and a memory coupled to the processor.

39. The computer program product of claim 37, wherein the wireless wide area network interface comprises a cellular network interface.

40. The computer program product of claim 37, wherein the processor is configured to receive a short messaging service (SMS) message from the wireless device, and wherein the wireless local area network interface comprises a WiFi™ technology network interface.

41. The computer program product of claim 37, wherein the wireless device comprises at least one of a cellular telephone, a smart phone, a portable computer, a tablet device, a media player device, a global positioning system (GPS) device, or a personal digital assistant (PDA) device.

42. The computer program product of claim 37, wherein the set of station information comprises station (STA) information associated with the wireless device, and wherein the operations further comprise communicating with the wireless device via a short messaging service (SMS) message.

43. The computer program product of claim 42, wherein the STA information comprises at least one of address information associated with the wireless device or key information associated with the wireless device.

44. The computer program product of claim 37, wherein the set of access point information comprises at least one of address information associated with the at least one access point, a set of channel information associated with the at least one access point, a set of service set identification (SSID) information associated with the at least one access point, or cost information for data link access through the at least one access point.

45. The computer program product of claim 37, wherein the non-transitory computer-readable medium comprises at least one instruction for causing a computer to transmit a set of security key information to the wireless device and the at least one access point.

46. The computer program product of claim 45, wherein the non-transitory computer-readable medium comprises at least one instruction for causing a computer to initiate an authentication process between the wireless device and the at least one access point based on the set of security key information.

47. The computer program product of claim 37, wherein the set of location information comprises at least one of location information captured via global position system (GPS) data, base station pilot data, geographic cell identifier data, cellular network data, Doppler effect data, or signal strength data.

48. The computer program product of claim 37, wherein at least one of the receiving of a set of location information, the transmitting of a set of access point information, or the transmitting of a set of station information comprises initiating a transmission over a secure transmission link with the wireless device.

49. A method of configuring data connections on a wireless device, the method comprising:
transmitting a set of location information associated with the wireless device via a wireless wide area network interface to a wireless handoff gateway;
receiving, in the wireless device from the wireless handoff gateway, a set of access point information associated with a set of access points that are within connection range of the wireless device via a wireless local area network interface;
transmitting a set of station information associated with the wireless device to the wireless handoff gateway;
identifying at least one access point in the set of access points to establish a data connection with the wireless device via the wireless local area network interface; and
transitioning the data connection of the wireless device from the wireless wide area network interface to the wireless local area network interface based on identifying the at least one access point.

50. The method of claim 49, wherein transmitting the set of location information comprises at least one of transmitting the set of location information at predetermined intervals or transmitting the set of location information on an event-triggered basis.

51. The method of claim 49, wherein the set of location information comprises at least one of location information captured via global position system (GPS) data, base station pilot data, geographic cell identifier data, cellular network data, Doppler effect data, or signal strength data.

52. The method of claim 49, wherein transitioning the data connection comprises performing an authentication process with the at least one access point based on the set of access point information and the set of station information.

53. The method of claim 52, wherein the authentication process is based on a set of security key information.

54. The method of claim 53, wherein the security key information includes a temporary key generated by the wireless handoff gateway.

55. The method of claim 49, wherein transitioning the data connection comprises performing an association process with the at least one access point.

56. The method of claim 55, wherein the association process comprises:
an active/passive scan process between the wireless device and one or more access points in the set of access points; and
a determination that the at least one access point is available to accept association of the wireless device based on the active/passive scan process.

57. A wireless device, comprising:
a first interface configured to communicate with a wireless wide area network;
a second interface configured to communicate with a wireless local area network; and
a processor coupled to the first interface and to the second interface, the processor configured to:
communicate using the first interface and the second interface,
transmit, via the first interface, a set of location information associated with the wireless device to a wireless handoff gateway,
receive, in the wireless device from the wireless handoff gateway, a set of access point information associated with a set of access points that are within connection range of the wireless device via the wireless local area network, the set of access point information identifying to the wireless device a plurality of the access points,
identify at least one access point in the set of access points to establish a data connection of the wireless device via the wireless local area network, and
transition the data connection of the wireless device from the first interface to the second interface based on the identification of the at least one access point.

58. The wireless device of claim 57, wherein the wireless handoff gateway comprises a platform that includes a second processor, and wherein transmitting the set of location information comprises at least one of transmitting the set of location information at predetermined intervals or transmitting the set of location information on an event-triggered basis.

59. The wireless device of claim 57, wherein the set of location information comprises at least one of location information captured via global position system (GPS) data, base station pilot data, geographic cell identifier data, cellular network data, Doppler effect data, or signal strength data.

60. The wireless device of claim 57, wherein transitioning the data connection comprises performing an authentication process with the at least one access point based on the set of access point information and the set of location information.

61. The wireless device of claim 60, wherein the authentication process is based on a set of security key information.

62. The wireless device of claim 61, wherein the security key information includes a temporary key generated by the wireless handoff gateway.

63. The wireless device of claim 57, wherein transitioning the data connection comprises performing an association process with the at least one access point.

64. The wireless device of claim 63, wherein the association process comprises:
an active/passive scan process between the wireless device and one or more access points in the set of access points; and
a determination that the at least one access point is available to accept association of the wireless device based on the active/passive scan process.

65. A wireless device, comprising:
first means for interfacing to a wireless wide area network;
second means for interfacing to a wireless local area network; and
means for processing information, the means for processing information coupled to the first means for interfacing and to the second means for interfacing, the means for processing information configured to:
communicate using the first means for interfacing and the second means for interfacing,
transmit, via a wireless wide area network interface, a set of location information associated with the wireless device to a wireless handoff gateway,
receive, in the wireless device from the wireless handoff gateway, a set of access point information associated with a set of access points that are within connection range of the wireless device via the wireless local area network, the set of access point information identifying to the wireless device a plurality of the access points, identify at least one access point in the set of access points to establish a data connection of the wireless device via the wireless local area network, and transition the data connection of the wireless device from the first means for interfacing to the second means for interfacing based on the identification of the at least one access point.

66. The wireless device of claim 65, wherein the wireless handoff gateway includes a processor and a memory coupled to the processor, and wherein transmitting the set of location information comprises at least one of transmitting the set of location information at predetermined intervals or transmitting the set of location information on an event-triggered basis.

67. The wireless device of claim 65, wherein the set of location information comprises at least one of location information captured via global position system (GPS) data, base station pilot data, geographic cell identifier data, cellular network data, Doppler effect data, or signal strength data.

68. The wireless device of claim 65, wherein transitioning the data connection comprises performing an authentication process with the at least one access point based on the set of access point information and the set of location information.

69. The wireless device of claim 68, wherein the authentication process is based on a set of security key information.

70. The wireless device of claim 69, wherein the security key information includes a temporary key generated by the wireless handoff gateway.

71. The wireless device of claim 65, wherein transitioning the data connection comprises performing an association process with the at least one access point.

72. The wireless device of claim 71, wherein the association process comprises:
an active/passive scan process between the wireless device and one or more access points in the set of access points; and
a determination that the at least one access point is available to accept association of the wireless device based on the active/passive scan process.

73. A computer program product, comprising:
a non-transitory computer-readable medium comprising instructions that are executable by a computer to initiate operations comprising:
transmitting a set of location information associated with a wireless device via a wireless wide area network interface to a wireless handoff gateway;
receiving, in the wireless device from the wireless handoff gateway, a set of access point information associated with a set of access points that are within connection range of the wireless device via a wireless local area network, the set of access point information identifying to the wireless device a plurality of the access points;
identifying at least one access point in the set of access points to establish a data connection of the wireless device via the wireless local area network; and
transitioning the data connection of the wireless device from the wireless wide area network interface to a wireless local area network interface based on the identifying of the at least one access point.

74. The computer program product of claim 73, wherein the wireless handoff gateway includes a processor and a memory coupled to the processor, and wherein transmitting the set of location information comprises at least one of transmitting the set of location information at predetermined intervals or transmitting the set of location information on an event-triggered basis.

75. The computer program product of claim 73, wherein the set of location information comprises at least one of location information captured via global position system (GPS) data, base station pilot data, geographic cell identifier data, cellular network data, Doppler effect data, or signal strength data.

76. The computer program product of claim 73, wherein an instruction for causing the computer to transition the data connection causes the computer to perform an authentication process with the at least one access point based on the set of access point information and the set of location information.

77. The computer program product of claim 76, wherein the authentication process is based on a set of security key information.

78. The computer program product of claim 77, wherein the security key information includes a temporary key generated by the wireless handoff gateway.

79. The computer program product of claim 73, further comprising at least one instruction for causing the computer to perform an association process with the at least one access point.

80. The computer program product of claim 79, wherein the association process comprises:
an active/passive scan process between the wireless device and one or more access points in the set of access points; and
a determination that the at least one access point is available to accept association of the wireless device based on the active/passive scan process.

81. A method of associating a wireless device with an access point, the method comprising:
transmitting, from the access point to a wireless handoff gateway, a set of access point information;
receiving, from the wireless handoff gateway via a wireless wide area network interface, a set of location information associated with the wireless device;
transmitting a set of access point information associated with the access point to the wireless handoff gateway;
receiving, from the wireless handoff gateway, a set of station information associated with the wireless device in the access point; and
establishing a data connection between the access point and the wireless device via a wireless local area network interface based on the set of access point information and the set of station information.

82. The method of claim 81, further comprising receiving a set of location information associated with the wireless device from the wireless handoff gateway.

83. The method of claim 82, wherein receiving the set of station information comprises receiving the set of station information when the wireless device is approaching or within range of the access point, based on the set of location information.

84. The method of claim 81, wherein establishing the data connection comprises performing an authentication process with the access point based on the set of station information.

85. The method of claim 84, wherein the authentication process is based on a set of security key information.

86. The method of claim 85, wherein the security key information includes a temporary key generated by the wireless handoff gateway.

87. The method of claim 81, wherein establishing the data connection comprises performing an association process with the access point.

88. The method of claim 87, wherein the association process comprises:
- an active/passive scan process between the wireless device and the access point; and
- a determination that the access point is available to accept association of the wireless device based on the active/passive scan process.

89. The method of claim 81, wherein the data connection comprises a connection to the Internet.

90. An access point device, comprising:
- a first interface configured to communicate with a wireless wide area network;
- a second interface configured to communicate with a wireless local area network; and
- a processor coupled to the first interface and to the second interface, the processor configured to:
- communicate using the first interface and the second interface,
- transmit, to a wireless handoff gateway, access point information that is associated with the access point device and that is included in a set of access point information provided to a wireless device, the set of access point information identifying a plurality of access points that includes the access point device,
- receive, from the wireless handoff gateway, a set of station information associated with the wireless device, and
- establish a data connection with the wireless device via the wireless local area network based on the set of access point information and the set of station information.

91. The access point device of claim 90, wherein the processor is further configured to receive a set of location information associated with the wireless device from the wireless handoff gateway, and wherein the wireless handoff gateway comprises a platform that includes a second processor.

92. The access point device of claim 91, wherein receiving the set of station information comprises receiving the set of station information when the wireless device is approaching or within range of the access point device, based on the set of location information.

93. The access point device of claim 90, wherein establishing the data connection comprises performing an authentication process with the wireless device based on the set of station information.

94. The access point device of claim 93, wherein the authentication process is based on a set of security key information.

95. The access point device of claim 94, wherein the security key information includes a temporary key generated by the wireless handoff gateway.

96. The access point device of claim 90, wherein establishing the data connection comprises performing an association process with the wireless device.

97. The access point device of claim 96, wherein the association process comprises:
- an active/passive scan process between the wireless device and the access point device; and
- a determination that the access point device is available to accept association of the wireless device based on the active/passive scan process.

98. The access point device of claim 90, wherein the data connection comprises a connection to the Internet.

99. An access point device, comprising:
- first means for interfacing to a wireless wide area network;
- second means for interfacing to a wireless local area network; and
- means for processing information, the means for processing information coupled to the first means for interfacing and to the second means for interfacing, the means for processing information configured to:
- communicate with the first means for interfacing and the second means for interfacing,
- transmit, to a wireless handoff gateway, access point information that is associated with the access point device and that is included in a set of access point information provided to a wireless device, the set of access point information identifying a plurality of access points that includes the access point device,
- receive, from the wireless handoff gateway, a set of station information associated with the wireless device, and
- establish a data connection with the wireless device via the wireless local area network based on the access point information and the set of station information.

100. The access point device of claim 99, wherein the means for processing information is further configured to receive a set of location information associated with the wireless device from the wireless handoff gateway, and wherein the wireless handoff gateway comprises a platform that includes a processor.

101. The access point device of claim 100, wherein receiving the set of station information comprises receiving the set of station information when the wireless device is approaching or within range of the access point device, based on the set of location information.

102. The access point device of claim 99, wherein establishing the data connection comprises performing an authentication process with the wireless device based on the set of station information.

103. The access point device of claim 102, wherein the authentication process is based on a set of security key information.

104. The access point device of claim 103, wherein the security key information includes a temporary key generated by the wireless handoff gateway.

105. The access point device of claim 99, wherein establishing the data connection comprises:
- an active/passive scan process between the wireless device the access point device; and
- a determination that the access point device is available to accept association of the wireless device based on the active/passive scan process.

106. The access point device of claim 105, wherein establishing the data connection further comprises performing an association process.

107. The access point device of claim 99, wherein the data connection comprises a connection to the Internet.

108. A computer program product, comprising:
- a non-transitory computer-readable medium comprising instructions executable by a computer to initiate operations comprising:
- transmitting, from an access point to a wireless handoff gateway, a set of access point information;
- receiving, from the wireless handoff gateway, a set of location information associated with a wireless device;
- transmitting access point information that is associated with the access point and that is included in a set of access point information provided to a wireless device, the set of access point information identifying a plurality of access points that includes the access point;

receiving, from the wireless handoff gateway, a set of station information associated with the wireless device in the access point; and establishing a data connection between the access point and the wireless device based on the set of access point information and the set of station information.

109. The computer program product of claim 108, further comprising at least one instruction for causing the computer to receive a set of location information associated with the wireless device via a processor of the wireless handoff gateway.

110. The computer program product of claim 109, wherein receiving the set of station information comprises receiving the set of station information when the wireless device is approaching or within range of the access point, based on the set of location information.

111. The computer program product of claim 108, wherein establishing the data connection comprises performing an authentication process with the wireless device based on the set of station information.

112. The computer program product of claim 111, wherein the authentication process is based on a set of security key information.

113. The computer program product of claim 112, wherein the security key information includes a temporary key generated by the wireless handoff gateway.

114. The computer program product of claim 108, wherein establishing the data connection comprises performing an association process with the wireless device.

115. The computer program product of claim 114, wherein the association process comprises:

an active/passive scan process between the wireless device and the access point; and a determination that the access point is available to accept association of the wireless device based on the active/passive scan process.

116. The computer program product of claim 108, wherein the data connection comprises a connection to the Internet.

* * * * *